United States Patent
Gjerde

(10) Patent No.: US 12,449,335 B2
(45) Date of Patent: Oct. 21, 2025

(54) PISTON PUMP SYRINGE COLUMN METHOD AND DEVICE

(71) Applicant: Douglas T. Gjerde, Saratoga, CA (US)

(72) Inventor: Douglas T. Gjerde, Saratoga, CA (US)

( * ) Notice: Subject to any disclaimer, the term of this patent is extended or adjusted under 35 U.S.C. 154(b) by 230 days.

(21) Appl. No.: 18/267,621

(22) PCT Filed: Dec. 19, 2021

(86) PCT No.: PCT/US2021/064255
§ 371 (c)(1),
(2) Date: Jun. 15, 2023

(87) PCT Pub. No.: WO2022/140212
PCT Pub. Date: Jun. 30, 2022

(65) Prior Publication Data
US 2024/0060861 A1    Feb. 22, 2024

Related U.S. Application Data

(60) Provisional application No. 63/233,743, filed on Aug. 17, 2021, provisional application No. 63/128,844, filed on Dec. 21, 2020.

(51) Int. Cl.
*G01N 1/34* (2006.01)
*G01N 1/40* (2006.01)

(52) U.S. Cl.
CPC .............. *G01N 1/34* (2013.01); *G01N 1/4005* (2013.01); *G01N 2001/4016* (2013.01)

(58) Field of Classification Search
CPC ..... B01L 2300/0681; B01L 2400/0478; B01L 3/0293; G01N 1/34; G01N 1/4005; G01N 2001/4016; G01N 35/1016; B01D 15/22
See application file for complete search history.

(56) References Cited

U.S. PATENT DOCUMENTS

| | | |
|---|---|---|
| 3,290,946 A | 12/1966 | Pursell |
| 4,601,212 A | 7/1986 | Shapiro |

(Continued)

FOREIGN PATENT DOCUMENTS

| | | |
|---|---|---|
| CN | 104076114 A | 10/2014 |
| CN | 204073501 U | 1/2015 |

(Continued)

OTHER PUBLICATIONS

Y. Han et al., Simultaneous determination of 124 pesticide residues in Chinese liquor and liquor-making aw materials (sorghum and rice hull) by rapid Multi-plug Filtration Cleanup and gas chromatography-tandem mass spectrometry Food Chemistry 241 (2018) 258-267.

(Continued)

*Primary Examiner* — Jennifer Wecker
*Assistant Examiner* — Jonathan Bortoli
(74) *Attorney, Agent, or Firm* — Sue S. Kalman

(57) ABSTRACT

A water solvated chromatography bed is packed into the distal end of a syringe barrel. The syringe pumping piston is modified to be flat to match the top frit structure (that is also flat). The piston pump is pushed into the syringe barrel until the piston is directly above the column top frit. The pumping piston is moved forth quickly to dislodge entrained air in the bed. The piston pump moves directly above the resin bed with no air gap above the bed.

14 Claims, 2 Drawing Sheets

(56) References Cited

U.S. PATENT DOCUMENTS

2012/0018381 A1      1/2012   Gjerde et al.
2017/0044518 A1      2/2017   Nelson et al.
2021/0387177 A1*    12/2021   Boardman .............. B01L 3/502
2022/0088537 A1*     3/2022   Brewer ................ B01D 69/108

FOREIGN PATENT DOCUMENTS

| CN | 111855366 A | 10/2020 |
|----|-------------|---------|
| GB | 1114729 A | 5/1968 |
| GB | 2213743 A | 3/1989 |
| JP | 2015219080 | 12/2015 |
| WO | WO2015/154048 A1 | 10/2015 |

OTHER PUBLICATIONS

Y, Qin et al. The comparison of dispersive solid phase extraction and multi-plugfiltration cleanup method based on multi-walled carbon nanotubes nanotubesfor pesticides multi-residue analysis by liquid chromatographytandem mass spectrometry J. Chrom. A, 1385 (2015) 1-11.

M. Venkatesan et al. Using CF11 cellulose columns to inexpensively and effectively remove human DNA from Plasmodium falciparum-infected whole blood samples Malaria Journal 2012, 11:41.

\* cited by examiner

PISTON PUMP SYRINGE COLUMN METHOD AND DEVICE

BACKGROUND OF THE INVENTION

Pipettes and robotic liquid handlers move liquids using pipette tips typically in a back-and-forth flow. Differences in air pressure above the liquid move the liquid in and out of pipette tips. The movement of liquids in and out of pipette tips relies on positive and negative air pressure in the tip chamber above the liquid that is drawn into the pipette tip. A negative pressure draws liquid into the pipette tip. A release of the negative pressure and even a slight positive pressure dispenses the liquid from the tips into designated locations.

Pipette tip chromatography extraction columns use the same principles. Pipette tip columns are pipette tips that have been modified to contain packed chromatography beds located at the distal end of the pipette tip. Liquids enter and exit the column in a back and forth fluid flow entering and exiting through the distal end of the column. These pipette tip columns can utilize air displacement for aspiration and expulsion to achieve back and forth flow.

Alternatively, vacuum or pressure can be used in pipette tip columns to achieve top-down flow. Vacuum above the column bed within the pipette tip column draws liquid into and through the column bringing liquid above the bed. Reversing the piston and applying air pressure to the liquid above the column pushes the liquid through the pipette tip column bed and out the distal end.

The pipette tip column technology is successful and used in automation. However, the pumping pressure is low. The air pressure (or vacuum) applied above the bed is less than 1-2 psi, less than 0.5 or even less than 0.2 psi. The liquid flow rate through the packed bed column is slow and time delays are needed at the end of each stroke cycle to allow the flow to catch up to the piston position. After the piston stroke has stopped, a delay of 30-60 seconds is added before the pump stroke is reversed and flow is reversed. Since the pipettes and robotic liquid handlers are computer controlled and automated, methods are easily programmed and implemented for these pipette tip columns. Manual use of pipette tip columns, especially for proteins, nucleic acids and biomolecules in an aqueous based solvent is not common if used at all because flow rates are slow and difficult to impossible to implement and control without computer control.

Syringe packed bed columns have been used but offer even more limitations. The columns are based on syringe bodies containing packed bed media. Liquid flow through the syringe column is accomplished by applying vacuum to the outlet (needle end) of the column while adding various liquids to the open top end of the syringe. Flow through the column is limited by the magnitude of vacuum applied at the outlet of the syringe column and the column backpressure.

There exists a need for columns, especially columns for biomolecule purification that can be coupled to higher pumping pressures and can be used manually.

SUMMARY OF THE INVENTION

A bed of media is contained within the barrel of a syringe with a pumping piston located directly above the column bed. In some embodiments of the invention, a top frit is located between the pumping piston and the bed of media. The piston of the column can reach to the top of the column and may touch the top frit. There is no air gap between the plunger piston and the column. A solvent or water-solvated or a water or aqueous-solvated chromatographic bed or extraction column media bed is contained within the barrel of a syringe. These chromatographic or extraction beds may be comprised of beads, particles or fibers of affinity chromatography media, solid phase extraction media, ion exchange media or any water-solvated media. In particular, the columns are useful for purification of biomolecules including proteins, nucleic acids, carbohydrates, lipids, organic molecules, etc. Water-solvated media are compatible with proteins, nucleic acids, carbohydrates, etc. or any large biostructure or biomolecule and will not damage the biomolecules. The capture groups or the functional groups of the media or at least a part of the substrate where the biomolecules contact can be solvated or hydrated. This hydration may be necessary to prevent biomolecules, especially proteins and biomolecules containing proteins, from being damaged during the capture and purification process. Water-solvated media can be used to purify, separate or detect organic or inorganic molecules.

A water-solvated chromatography bed is packed into the distal end of the syringe barrel. In some embodiments, the syringe pumping piston is modified to be flat in order to match the top frit structure (that is also flat). The piston pump is pushed into the syringe barrel until the piston is directly above the column top frit. In some embodiments, the pumping piston is moved back and forth quickly to dislodge air that has become entrained in the bed when the pumping piston was inserted. Fluids are pumped through the column by movement of the syringe pumping piston up and down in the piston chamber. The piston moves directly above the resin bed with no air gap above the bed. Thus, the pumping action of the piston pump in the syringe is integrated and directly above the column bed.

Any frit or frit type that does not damage the biomolecule may be used to secure the bed inside the syringe barrel. However, the piston pump must not physically dislodge or move the frit as this could crush the media bed in the syringe column.

Liquids are pulled or pushed directly through the column by a pumping piston applying pressure or alternatively, by vacuum. Since there is little or no air gap between the syringe piston and top frit of the column, the syringe piston can exert higher pumping pressures than the pressures used with pipette tip columns or syringe vacuum columns. However, the piston pump must not move the frit and crush the water-solvated media either by careful manipulation of the pumping piston or by very tight fitting and secure top frit or by a physical barrier preventing the end of the piston pump to touch and move the frit. Nevertheless, the piston pump can apply extreme force to the frit and care must be taken not to overcome any barriers to move the frit and crush the solvated media bed.

Since the column bed and the piston pump are contained in the same tubular chamber, the diameter of the column bed and the pumping piston are the same or at least quite similar. This means the piston pump may touch the top frit of the column.

Fluids are pumped through the column by pumping a liquid where the area between the piston pump and column bed does not have an air gap. This allows higher positive pressure and higher negative pressures to be applied above the column bed for efficient and effective pumping.

It is important that the syringe pumping piston does not touch the top frit of the column. If the piston touches the bed, it could (especially with further pressure), push the top frit down and crush the bed. This would create a non-reliable column because the flow channels in the media may change diameter. Water solvated media and resins are easily crushed with pressure. The extent of compression cannot be controlled and is unpredictable (unlike conventional packed bed columns or pipette tip columns where the columns are packed to a specified volume or density). In the same manner as a woman's high heel shoe can damage floors and carpet due to the small cross-sectional area of the shoe heel, the pumping piston of a syringe packed bed column can exert tremendous force and move the frit into the bed crushing the bed.

The pressure under a stiletto heel is greater (per unit of the very small area) than that under the feet of an elephant. [5] Green, Jack (2003). "Pressure Under High Heels". The Physics Factbook. Retrieved 20 Dec. 2012. https://hypertextbook.com/facts/2003/JackGreen.shtml A 1963 article in a US building maintenance magazine stated, "Replacement of floors is estimated to have cost at least half a billion dollars throughout the country since the advent of the stiletto heel fashion."[6] *Modern Sanitation and Building Maintenance*, Volume 15, 1963.

In some embodiments of the invention, the pumping piston and bed of media are the same diameter. In some embodiments of the invention, the syringe pumping piston is physically prevented from pushing into the bed or top frit of the bed and crushing the bed by the presence of a physical barrier. The physical barrier can take several forms. It can be a structure on the wall of the syringe barrel or on the top of the cylinder where the pumping piston is located or it can also be in the form of a tightly placed frit.

Organic and inorganic molecules, nucleic acids including DNA and RNA and proteins and other biomolecules may be captured and purified by columns of the invention. Nonrestrictive flow paths that don't trap large entities can be provided in the columns of the invention so that large entities such as cells including plant and animal cells, virus, bacteria, fungi, spores, and cell-like entities such as organelles may be captured and manipulated without damage.

Manual operation of the syringe column may be performed. The column may be held by hand or held in an apparatus with manual movement of the plunger. Care must be taken to avoid compressing the bed. In some embodiments the syringe may be placed into a motorized apparatus and operation may be programmed and automated.

Definitions

Media: column bed particles, beads or fibers having affinity, chromatographic, solid phase extraction or enzymatic properties.

Solvated media: Solvation is an interaction of a solute with the solvent. For the purposes of this invention, the solvent can be water or can contain water or can be an aqueous solution and the solute is column bed media. In media solvation, the media is swollen with the solvent.

Water solvated media: column, chromatographic media, beads or particles that are all or partly hydrophilic and swollen with water aqueous solution. The water solvated media may have affinity, chromatographic or solid phase extraction properties. The media particle or surface may be squeezable. Media or a portion of media can be squeezed or compressed upon pressure.

Chromatography media: Chromatography is a general term that includes affinity, reverse phase, normal phase, hydrophobic interaction, ion exchange, ion pairing and solid phase extraction media and enzymatic media.

Enzymatic media: Beads, fibers or particles of a substrate to which enzymes are bound or adsorbed. The enzymatic media may selectively and chemically interact with biomolecules passing through the bed.

Affinity media: beads, fibers or particles of a substrate having affinity chromatographic or solid phase extraction properties for biomolecules. The substrate itself may be selective for biomolecules or may comprise capture groups or functional groups that are selective for biomolecules.

Affinity fibers: fibers or threads of a substrate having, affinity, chromatographic or solid phase extraction properties for biomolecules. The substrate may be selective for biomolecules or may contain capture groups or functional groups that are selective for biomolecules.

The terms piston, the piston pump, piston plunger, pumping piston and syringe plunger are used interchangeably herein.

Piston pump force: pressure or force applied on the piston as the piston is pushed into the syringe barrel towards and onto the column media bed.

Squeezable bed: water solvated, swollen or water-wettable media that can compress in a column chamber when axial force is applied. In some cases, the surface of the media is spongy, squeezable and compressible. In some cases, the entire substrate may be squeezable or compressed. The media contains interstitial spacing or other properties allowing compression of the bed under pressure.

Squeezable media: any media or portion of media that can compress under pressure.

Resin: bed media or particles.

Water solvated: media that is hydrophilic where water or aqueous type solvent or buffer acts to solvate at least a portion of the media structure.

No air gap: The space between the end of the piston pump and the top of the media bed or media frit contains minimal or no air and contains mostly liquid.

Substrate: a base material of bed media onto which optional functional groups may be attached. Substrate may be polymer, inorganic, beads, particles, cloth or filters. The substrate may be rolled or crumpled.

Capture groups: chemical groups contained on media that have selectivity for biomolecules.

Functional groups: chemical groups contain on media that have selectivity for biomolecules. These may include enzymes that have a selectivity for biomolecules and can also react upon biomolecules Biomolecules: Any molecule associated with biology including proteins, nucleic acids, cells, viruses, organelles.

Axial force: force directed through the top of the piston pump.

Axial compression: compression of a water-swollen bed along the axis following the piston pump.

Syringe barrel: the part of the syringe containing the bed of media and the piston pump.

Immobilized frit: frit at the top of the media bed that does not move under operation of the piston pump.

Piston pump: the piston that is inserted into the syringe barrel provides the pumping vacuum and pressure force through the column bed.

Piston pump collar: collar around and connected to the piston plunger preventing movement into the syringe barrel. This part of the plunger is located at the top of the plunger in the area that can be held with a hand.

Liquid gap: The space above the media bed and the piston plunger. In the columns of the invention, this contains little or no air. Pumping is performed with a gap that contains liquid and little or no air.

Organic and inorganic molecules: Smaller molecules comprised of. organic and/or inorganic materials.

Water-swollen, water-wettable, water-solvated, solvent-solvated and aqueous-solvated are all equivalent terms herein that refer to the ability of solvating at least portion of the media or the bed.

DETAILED DESCRIPTION OF INVENTION

Figure 1:
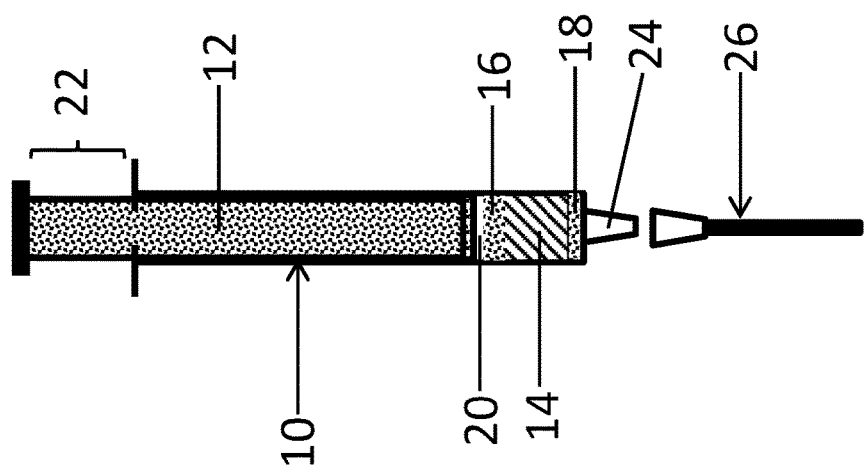
FIG. 1 is a depiction of a column with a solvated media bed and piston pump contained in a syringe barrel. The piston is located directly above the solvated media bed.

A water solvated column media bed is contained within the barrel of a syringe. The media bed may be comprised of beads, particles, rolled sheets or fibers of affinity media, ion exchange media, solid phase extraction media, enzyme media or any other chromatography media. In some embodiments, at least of portion of the syringe column media is water solvent solvated and squeezable.

The columns may be used for any type of chromatography, extraction separation or enzymatic reaction where water is at least a portion of the solvent.

In the columns of the invention, a solvent-solvated column bed is placed in the distal end of the syringe barrel. Then, the piston pump is placed into the barrel above the bed, pushing air through the column bed until the piston pump is directly above the top frit of the column. In some embodiments of the invention, the column has no top frit. Normally, pushing air through a water-solvated bed would be harmful to the media in bed because air can become entrained in the bed, causing channeling of liquid through the bed. This channeling reduces the ability of the column to capture and release biomolecules because the flow path goes through the channels and travels around the entrained air bubbles. When this happens, much of the column is no longer useful because the air bubbles prevent interaction of the liquids in the column with functional groups on the media. In addition, entrained air may cause increased back pressure of the column. In some embodiments of the invention, the column media is optionally conditioned, sample is captured, impurities are washed and a desired material is eluted and recovered.

The piston pump is pushed into the syringe barrel until it is directly above the column top frit. The piston can be moved back and forth quickly to dislodge any air that has become entrained in the bed when the piston pump was inserted. Fluids are pumped through the column by movement of the piston pump up and down in the syringe barrel.

In some embodiments, the piston pump is modified to match the shape of the top frit structure to reduce or minimize the air gap or liquid gap. This allows the air to be removed from the column through rapid back and forth flow motion. After air removal, the piston can be positioned directly above the resin bed so that no air gap exists above the bed. Thus, the piston pump is integrated and directly above the column bed.

Liquids are pulled or pushed directly through the column. The plunger is retracted to pull liquids into the column. Since there is minimal or no air gap between the syringe column piston and top frit of the column, the plunger can exert much higher pumping pressures than those used with pipette tip columns, gravity flow or vacuum columns. One advantage of this is that column operation can be performed manually if desired due to the short times required to operate the column.

Water-solvated media are compatible with proteins, nucleic acids and other biomolecules because the capture or functional groups and at least a part of the media substrate are hydrated. This hydration is necessary to prevent biomolecules, including nucleic acids and especially proteins, from being damaged during the capture and purification process. Proteins and other biomolecules may be captured and purified with the columns of the invention.

With certain water solvent solvated media, the columns of the invention may be used for purification, manipulation and detection of cells, viruses, organelles, bacteria and other large complex biomolecules. Water-solvated media and column frits and construction in these types of columns will have additional constraints such that column liquid flow paths do not trap, sheer or damage these very large biomolecules. Cells and cell type entities may be captured and manipulated without damage in the columns of the invention with these additional features.

In some embodiments of the invention, water and aqueous buffers are used with the water-solvated beads and media. In some embodiments, water-miscible organic solvents may be added to the buffers.

In some embodiments of the invention, the top and bottom of the column medium is contained by two frits. In some embodiments, the media is not contained by a top frit at the piston pump end. In some embodiments, the media is not contained by frits such as in cases where the media is fibers, membrane, or a monolith of material.

The syringe column of the invention is useful in the capture biomolecules. Operation can be performed by manually holding the syringe column. The steps of a typical operation are 1) optional conditioning, 2) capture of the desired entity from a sample, 3) washing (multiple washes with optional different stringency solutions and 4) elution of the desired entity. The operation is rugged from a purification standpoint. The flow rate through the column may be varied or the number of cycles may be varied, and an acceptable product may still be obtained.

The syringe column of the invention can be used to enzymatically digest biomolecules using an immobilized enzyme as the column media. Examples of immobilized enzymes include all proteases, glutathione S-transferase, pepsin, PNGase F. Immobilzed enzymes can be used in columns of the invention for oxidation, reduction, inter- and intramolecular transfer of groups, hydrolysis, cleavage of covalent bonds, addition of groups to double bonds, isomerization in the fields bio R&D, bio diagnostics, environmental monitoring, biotransformation, diagnostics, pharmaceutical and food industries. One example of a company that produces useful enzymes is Genovis, Sweden and U.S.A. They produce a range of enzymes primarily for the biopharmaceutical industry including the development, production and quality control of biological drugs such as monoclonal antibodies, ADCs, biosimilars and bispecifics. Including IgG digestion—FabRICATOR™, FabALACTICA™, GingisKHAN™, FabULOUS™ & FabRICATOR Z™, General proteolysis—GingisREX™, De-glycosylation and conjugation of IgGs—GlycINATOR™, IgGZERO™ and GlyCLICK™ and O-glycan analysis—OglyZOR™, OpeRATOR™, GlycOCATCH™ and SialEXO™

The steps of a typical operation are 1) optional conditioning and 2) treatment of the biomolecule with the immobilized enzyme by passing the biomolecule repeatedly through the column of the invention. The flow rate through the column may be varied or the number of cycles may be varied, and an acceptable product may still be obtained.

In some embodiments of the invention, the syringe column may be operated manually. The column may have a needle or tube at the distal end of the column that may be placed in vials or wells containing various liquids. The syringe plunger is drawn back to draw up liquid and pushed down again to dispense liquid. The operation may be performed any number of times with any number of solutions. For biomolecule purification or manipulation, the liquids can be aqueous or water miscible. Water in these solutions swells at least a portion of the media contained in the syringe barrel.

In some embodiments the syringe column may be placed into a motorized apparatus and operation may be programmed and automated. The piston pump may move to the top the column and back again pulling liquid into the column and pushing it out again. Automated operation of columns may be performed as a single column or with columns operated in parallel, 2-8 at a time, 2-12 at a time or 2-96 at a time. Operation may be computer controlled and placement of the column(s) into liquid may be automated.

FIG. 1 shows a chromatographic, extraction or enzyme column of the invention. Solvated media bed 14 and a piston pump 12 are contained in a syringe barrel 10. Piston pump 12 is located directly above solvated media bed 14. solvated media bed 14 is contained by top frit 16 and bottom frit 18. The bottom of the column contains luer taper fitting 24 and needle 26. Liquid gap 20 contains almost all liquid and little or no air. In some embodiments, the frits and luer taper fitting are absent.

However, there is one step of the operation where care is taken. The plunger of a column of this type will readily squeeze or compress the water-solvated bed. By squeezing, at least a portion of the water can be removed from the media. The amount of possible squeezing is represented by squeeze distance 22. Axial force directed through the top of the piston pump may result in axial compression of a swollen bed along the axis following the piston. The compression distance is the distance the piston has moved or compressed the media bed through movement of the frit. Squeezing the bed media makes performance of the column unpredictable and useless. If the bed were to become compressed, liquid flow would be restricted and only low flow rates would be possible. In some cases, flow could even be stopped or almost stopped.

Even with normal manual handling of the syringe piston pump, the piston can exert tremendous force into the column bed, especially with back and forth motion. Even moderate manual control using a few pounds of pressure in a downward stroke can exert damaging forces of tens to hundreds of pounds per square inch of pressure at the top of the column bed. Simple pushing of the piston down to the bed to push liquid through the bed may cause damage if the piston pushes and compresses the media contained in the syringe barrel. This axial force compression along the axis of the bed following the plunger syringe piston plunger produces axial compression and will readily compress any water solvated media bed.

Water solvated media of consisting beads, fibers, particles, particles surfaces are by nature compressible when a force is applied. As the media is compressed the flow paths around the media may close and the resistance to fluid flow increases. This may decrease the ability of the column capture, wash or elute. This will make the performance of the column unpredictable and therefore useless.

To prevent compression of the bed, the piston should not push into the top of the column bed. This can be accomplished manually with careful control by the user. This can be accomplished with manual or automated operation controlling the position of the piston as it is moved. The user may look at the piston during operation being careful to only touch the bed and not squeeze the bed. Another way to prevent squeezing of the bed is to program the automated robot to push the piston in the downward motion to a limited distance above the bed or only touching the bed and not squeezing the bed.

Figure 2:
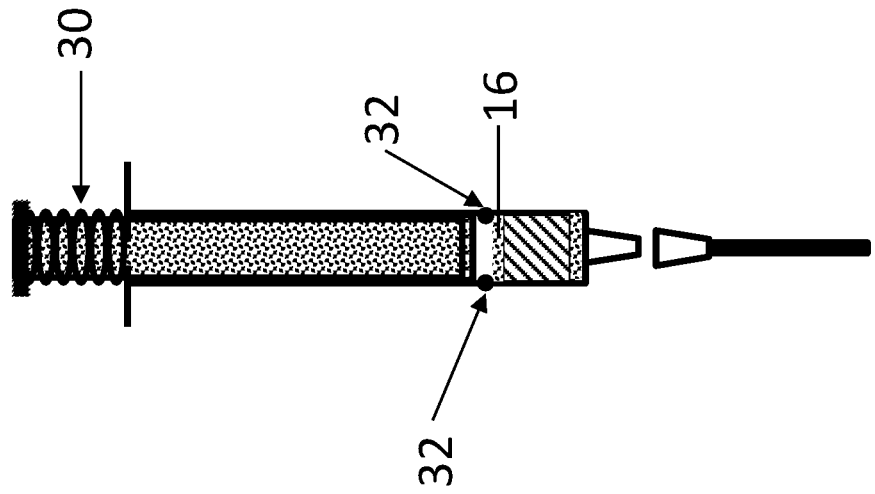
FIG. 2 is a depiction of a syringe column with a compression spring encircling the piston pump, syringe barrel piston stops, and a hard press top frit.

In some embodiments of the invention, the pump piston is physically prevented from moving the top frit or top of the column and pressing into the column bed. In columns of the invention, there are many ways to physically prevent bed squeezing of water solvated media by the piston. In FIG. 2 several of methods are shown. The compression spring, piston stops, and hard press frit are all physical examples of barriers to prevent the piston pump from squeezing the media bed. The compression spring also provides an assist to pulling the piston pump up from the bed.

Compression spring assist and hard stop 30 provides two functions. As the spring is compressed by pushing the piston down, there is a point at which the spring cannot be compressed any more. This is a hard stop and prevents the bed from being squeezed. Then when the piston is moved in the opposite direction to pull liquid into the column, the spring will go back to its normal resting position and the spring will assist in moving the piston upward.

Piston stops 32 also can prevent movement of the piston into the column bed. Piston stops can be any structure that prevents the piston from compressing the column bed. For example, a ring can be placed into the column with a press fit. Or, a protrusion can be placed on the inside of the syringe barrel for example, with the use of a melting deforming tool on the outside of the barrel. The protrusion does not allow the piston to move past a point above the column bed. Another way to provide a physical barrier is to hard press the top frit 16 into the column so that the frit is immobile or difficult to move. In one embodiment of the invention, the bed is filled and then the top frit is forcibly positioned into place. In this press fit with force, the top frit into the syringe barrel so that it is seated tightly and cannot move. Then the piston can touch the top of the frit with force without moving the top frit into the bed.

Other variations of these methods and designs are possible. In another embodiment, a collar may be placed around the top of the piston before it can enter the barrel.

A common bed volume with the syringe column is 100 or 200 µL packed into a 1 mL body. In one example of the columns that were produced, a plastic ridge inside the syringe at the very top of the inside barrel was removed to allow placing the frits inside the column. This ridge is quite common with most syringes.

Column bodies of 0.1 mL, 0.5 mL, 1 mL, 2 mL, 5 mL, 10 mL, 25 mL, 50 mL, 100 mL, 200 mL and sizes larger and in between may be used. In some embodiments, the outside of the column barrel is 9 mm or smaller. This is needed to place the columns into a 96 well format.

Smaller bed volume sizes can be made and operated including 1, 5, 10, 25, 50, and 75 µL beds. Larger bed can be made and be operated including 300, 400, and 500 µL beds. If the syringe size is increased, 1, 2, 3, 4, and 5 mL beds may be produced and operated. Still larger syringe and syringe barrel columns may be produced and operated including 10, 25, 50, 100, 200, 500 mL, 1 L and larger column media beds.

After the bed is packed, the plunger is placed into the barrel. Normally procedure is to place as much water as possible to avoid pumping air into the column bed. However, some air does enter the media bed and is almost impossible to avoid. This is not desired, and air must be avoided because it promotes channeling and changes in backpressure. Biomolecules can be damaged when exposed to air.

One way to remove the air is by inverting the column and rapidly forcing liquid (and entrained air) out of the column. There is only liquid above the piston. The air has moved to the bed and then is forced out through the bed with liquid behind by rapid movement of the piston. Another method is to rapidly use the piston pump to push liquid back and forth through the column. After air is removed, there is no danger of reintroducing air as long as only liquid is pulled into the column and there are no air leaks. Entrained air removal is an essential part of the manufacturing process but is difficult to accomplish.

In some embodiments of the invention the end of the syringe column is a needle. The needle is held on to the column with a luer taper fitting. In some embodiments of the invention the needle is a blunt needle. In some embodiments of the invention the needle is a piercing needle. A piercing needle may be called a hypodermic needle. A hypodermic needle is a hollow needle commonly used with a syringe to inject substances into the body or extract fluids from it.

In some embodiment, the vials have piercing caps limiting exposure of the liquids. A sealed vial may be pierced, and liquid may be pumped in and out of a vial. The vial prevents air exposure of the vial contents.

There are several advantages of columns and methods of the invention. The columns can be manually operated. No electronic pipette or liquid handler is needed because high pumping pressures can be generated in the column. However, the columns can be automated. They may be placed in a computer or electronically controlled devices to move the piston pump in a controlled and predictable manner. An automated multichannel instrument can operate multiple columns in parallel. The multichannel instrument may operate up to 8 columns, up to 12 columns or up to 96 columns in parallel. If the column diameter is decreased to 4.5 mm or smaller, up to 384 columns may be operated in parallel.

The columns may be operated manually and then placed in a multi-channel automated instrument. For example, a sample may be captured manually and then the column may be placed in an instrument to perform the steps of washing and elution. The columns may use a blunt end or piercing needle and draw up buffer including sample, wash and elution solvents.

The columns may be used for general protein purification and general biomolecule purification and manipulation. The columns may be used for cell purification and manipulation. Automated columns of the invention may be particularly useful for enzyme columns where enzymatic cleaving is performed under controlled conditions.

EXAMPLES

Example 1. Manufacture of a Syringe Column with a Top Frit

A plunger from 1 mL plastic syringe is removed from the barrel. The plastic ridge on the top inside of the barrel is removed with a 0.250-inch drill bit. A bottom frit is placed inside the barrel and 100 µl of agarose strong base ion exchanger is placed inside the barrel. The resin on the wall is rinsed. A top frit is placed at the top of the column and is hard press fit with force to just reaching the top of the resin bed. Deionized (DI) water is added into the barrel. The piston pump is placed into the syringe barrel and pushed to the top frit, just reaching the frit but not moving the frit or squeezing media bed. In this example the frit is pressed in with sufficient force to hold the frit in position. A needle is placed on the luer taper, and the end of the column is placed in DI water. The plunger is moved rapidly back and forth to remove air from the air gap and from the column bed. The column is ready for use.

Example 2. Manufacture of a Syringe Column

The column is manufactured as in example 1 except it does not contain a top frit Example 3. Operation of the Syringe Column The column from Example 1 or Example 2 is operated manually and the user monitors the piston movement and position to prevent crushing of the bed.

Example 4. Manufacture of a Syringe Column with Protrusions in the Syringe Wall

Manufacture of the column is the same as in Example 1 except hot melt protrusions are placed just above the top frit or top of the media bed to prevent the piston pump from touching the top frit or top of the media bed. after the frit is placed in the column, two hot melt protrusions may be inserted just above the inserted frit using a hot rod placed on the outside of the syringe barrel Example 5. Capture of a Virus Using Ion Exchange Saliva from an individual infected with a virus is collected and placed in a vial. Water is added to the saliva. The column of Example 1 was used to pass the saliva and water mixture through the column. Virus is captured by the ion exchange sites on the resin. Optionally after capture, an aqueous acetonitrile mixture was passed back and forth through the column. The virus is eluted from the column with 500 µL of 1 M sodium chloride. The virus RNA may be captured with a kit obtained from Zymo. The purified RNA is placed in a vial and the components for RNA amplification are added. The sample is amplified using QPCR or LAMP and the virus is detected.

Example 6. Digestion of a Protein with a Trypsin Resin

In another example the column contains an agarose resin with trypsin enzyme immobilized on the substrate. The column is placed into an instrument to control back and forth flow cycling. The speed of the piston pump is set to pump at 1 mL/min. The number of cycles of pumping is set 15 cycles. A protein solution is placed in a vial and pumped through the column enzyme resin for 30 min at room temperature. The cleaved fragments of the protein are analyzed by LC/MS.

The invention claimed is:

1. A syringe column comprising:
    a syringe barrel including a first portion and a second portion;
    a solvated media bed including a first end, a second end and media selected from the group consisting of chromatographic media, extraction media, and enzymatic media, and disposed within the second portion of the syringe barrel;
    a first frit disposed proximal to the second end of the solvated media bed; and
    a pumping piston positioned in the syringe barrel proximal to the second end of the solvated media bed wherein the pumping piston comprises a piston stopper or a compression spring, and the piston stopper or the compression spring is configured to prevent the pumping piston from physically contacting the first end of the solvated media bed.

2. The syringe column of claim 1 further comprising a second frit disposed proximal to the first end of the solvated media bed.

3. The syringe column of claim 1 wherein the piston stopper further comprises:
    a second frit;
    a piston collar;
    a ring; and
    a plurality of protrusions; or a combination thereof.

4. The syringe column of claim 1 further comprising a holder configured to hold the syringe column.

5. A method of using the syringe column of claim 1, the method comprising:
    aspirating a liquid containing a biological structure, an organic structure or an inorganic structure through the second portion of the syringe barrel and into the solvated media bed through the second end of the solvated media bed by retracting the pumping piston such that the solvated media bed retains the biological structure, the organic structure or the inorganic structure in the media.

6. The method of claim 5 further comprising removing air from the syringe column prior to the aspirating the liquid:
    aspirating an aqueous solution from the second end of the solvated media bed and through the solvated media bed; and
    inverting the syringe column.

7. The method of the claim 5 further comprising removing air from the column prior to the aspirating the liquid by:
    aspirating an aqueous solution from the second end of the solvated media bed and through the solvated media bed; and
    moving the piston pump back and forth two or more times at a particular rate.

8. The method of claim 5 wherein the biological structure is a protein or a nucleic acid.

9. The method of claim 5 wherein the biological structure is a virus, a bacterium or a fungus.

10. The method of claim 5 wherein the biological structure is a cell.

11. The method of claim 5 wherein the biological structure is an organelle.

12. The method of claim 5 further comprising performing the aspirating the liquid using the syringe column and multiple corresponding syringe columns in parallel in an automated manner.

13. The method of claim 5 comprising manually performing the aspirating the liquid and wherein the syringe column further contains a pressed-in frit disposed proximal to the first end of the solvated media bed and the pumping piston is unable to move the pressed-in frit.

14. The method of claim 5, comprising manually performing the aspirating the liquid.

* * * * *